United States Patent Office 3,418,341
Patented Dec. 24, 1968

3,418,341
FLUORINATED ACYL AZIDES
Raymond J. Shozda, Wilmington, Del., assignor to E. I. du Pont de Nemours and Company, Wilmington, Del., a corporation of Delaware
No Drawing. Filed Aug. 14, 1964, Ser. No. 390,772
9 Claims. (Cl. 260—349)

The present invention relates to new organic azide compounds and to methods for their preparation.

Azides have been used in industry as gas-generating compounds, polymerization initiators, chemical intermediates, and for other uses. This invention provides a new group of azides which can be employed in many such uses. This invention also provides a process for preparing the aforementioned new azides as well as others of the rare fluorine-containing azide family.

The new compounds of the present invention have the structure $RCON_3$, wherein R is selected from the group consisting of F— and $F_2N$—. The process of this invention is a process for preparing fluoroazides which process comprises contacting molecular fluorine with at least one compound selected from the group consisting of $CO(N_3)_2$, $H_2NCON_3$ and

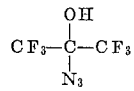

at a temperature below the decomposition temperature of said compound in an inert solvent.

As indicated above, the temperature of the fluorination reaction is below that at which the reaction becomes so vigorous that serious decomposition begins, yet sufficiently high so that the reaction proceeds at an appreciable reaction rate. The precise reaction temperature varies somewhat depending upon the particular compound being fluorinated. With carbonyl azide, the temperature usually ranges from —20 to 30° C. and, preferably, 0 to 30° C. With carbamazide, the reaction temperature is usually —20 to 50° C., and, preferably, 20 to 40° C., while with 2-azidohexafluoro-2-propanol, a reaction temperature of about —50 to 30° C. and, preferably, —30 to 25° C. is used.

The fluorine gas either alone or in admixture, for example, in amounts of 5 to 50% by volume, with inert gas, for example, nitrogen, argon, helium, etc., is introduced into a solution of the compound to be fluorinated in inert solvent, for example, by a sparge, distributor plate, or other conventional gas-liquid reaction devices. Examples of solvents include halogenated solvents such as halohydrocarbon oil; perfluorokerosene; perfluoro-2-butyltetrahydrofuran; "Freon"® fluorocarbon products such as dibromotetrafluoroethane, trichlorotrifluoroethane, tetrachlorodifluoroethane; perfluorotributylamine; methylene chloride.

The concentration of the compound being fluorinated as well as the rate of addition of fluorine also vary somewhat depending upon such compound. In general, the concentration of the compound being fluorinated varies from 0.1 to 15% and fluorine is introduced at a rate of about from 1/400 to 1/10 part of fluorine per part of compound per minute. With carbonyl azide, the concentration is usually about from 0.1 to 10% and, preferably 0.3 to 5% by weight and the addition rate is 1/400 to 1/10 part of fluorine per part of carbonyl azide per minute. With carbamazide, the concentration is usually 0.2 to 10% and, preferably 0.4 to 5% by weight, while the fluorine addition rate is 1/300 to 1/10 part by weight of fluorine per part of carbamazide per minute. With 2-azidohexafluoro-2-propanol, the concentration is usually about 0.4 to 10% and, preferably 2 to 7% by weight, while the rate of addition is usually of from 1/400 to 1/30 part of fluorine per part of 2-azidohexafluoro-2-propanol.

The resulting fluorinated products, $FCON_3$, $F_2NCON_3$ and $CF_3CON_3$ can be recovered by conventional means such as distillation.

In addition to the foregoing procedures, the new products of this invention also can be prepared by replacement of acyl chlorides thereof, i.e., FCOCl and $F_2NCOCl$ by azido groups.

This replacement of acyl chloride by azido groups is carried out by treating the acyl chloride with an azide salt of an alkali or alkaline earth metal in a diluent. Such azide salts as silver azide, sodium azide, potassium azide, ammonium azide, or lithium azide are useful but lithium azide is particularly useful because of its solubility in organic solvents. The replacement is carried out at a temperature of about from —10° to 60° C. but preferably from 10 to 30° C. The molar ratio of azide salt to acyl chloride used is about from 1/2 to 1/5 but preferably from 1/1 to 2/1.

The invention is illustrated in more detail by the following examples which, however, are not intended to be limiting. Parts and percentages, where given, are by weight unless otherwise indicated.

EXAMPLE 1

A solution of 3 parts of carbonyl azide ($CO(N_3)_2$) in 300 parts of perfluoro 2-butyltetrahydrofuran is stirred in a glass container irradiated by a sunlamp positioned seven inches above the container. A gas stream of 80/20 nitrogen-fluorine by volume is bubbled through the liquid at such a rate as to give a flow of 0.034 part of fluorine per minute for 8 hours. The temperature is maintained below 25° C. The exit gases are passed through a trap cooled to —80° C. After 8 hours the material collected in the trap is fractionally distilled to give $FCON_3$. Its vapor pressure-temperature curve is determined by standard methods and is described by the equation $$\log P_m = \frac{-1.43}{T} + 7.52$$

The $F^{19}$ NMR spectrum shows a single sharp peak at —4005 c.p.s., 56.4 megacycles versus trifluoroacetic acid as external reference.

The mass spectrum of $FCON_3$ is as follows:

| M/e | Assigned ion | Relative abundance |
|---|---|---|
| 89 | $FCON_3^+$ | 66.0 |
| 70 | $CON_3^+$ | 5.74 |
| 61 | $FCON^+$ | 68.7 |
| 47 | $FCO^+$ | 100.00 |
| 45 | $FCN^+$ | 3.13 |
| 42 | $N_3^+$, $NCO^+$ | 68.3 |
| 33 | $NF^+$ | 16.1 |
| 31 | $CF^+$ | 22.3 |
| 28 | $N_2^+$, $CO^+$ | 56.3 |
| 26 | $CN^+$ | 5.33 |
| 19 | $F^+$ | 1.20 |
| 16 | $O^+$ | 3.92 |
| 14 | $N^+$ | 31.4 |
| 12 | $C^+$ | 10.8 |

The characteristic peaks of the infrared spectrum of $FCON_3$ determined as a gas at 10 mm. pressure are:

$N_3$ group—4.5 and 8 microns
$C=O$ group—5.4–5.45 micron doublet
C—F group—8 micron region (overlaps $N_3$ peak)

$FCON_3$ is a dehydrating agent for chromatographic columns and for other enclosed areas. This is demonstrated by condensing together 89 parts of $FCON_3$ and 17 parts of water. After holding the temperature at 25° C. for 3 hours the contents of the vessel are analyzed by infrared. No water or $FCON_3$ are detected. For drying chromatographic columns, $FCON_3$ is passed through the column until it is detected at the outlet of the column. The column is then dry.

EXAMPLE 2

FCOCl (35.4 parts) is condensed in an evacuated container containing 25 parts of sodium azide and 400 parts of perfluorokerosene. The container is warmed to room temperature and stirred for 22 hours. A 0.01 aliquot of the product is passed through a gas chomatographic column (12 ft. x ¼ in. column of 20% "Kel-F" ester on firebrick) to separate 0.104 part of $FCON_3$ (45% yield).

EXAMPLE 3

A mixture of 1 mole of $F_2NCOCl$, 1 mole of $AgN_3$ and 1 part of perfluorokerosene is stirred 16 hours at room temperature. The volatiles are distilled through traps at 0° C., −80° C. and −196° C. The −80° C. trap contains mainly $F_2NCON_3$ (72%).

TABLE II.—MASS SPECTRUM OF DIFLUOROCARBAMAZIDE[1]

$$F_2N\overset{O}{\underset{\|}{C}}N_3$$

| M/e | Assigned ion | Relative abundance |
|---|---|---|
| 12 | $C^+$ | 6.58 |
| 14 | $N^+$ | 25.0 |
| 16 | $O^+$ | 1.60 |
| 19 | $F^+$ | 3.72 |
| 26 | $CN^+$ | 3.72 |
| 28 | $N_2^+$ | 73.5 |
| 30 | $NO^+$ | 4.71 |
| 31 | $CF^+$ [2] | 0.85 |
| 33 | $NF^+$ | 12.2 |
| 40 | $CN_2^+$ | 0.72 |
| 42 | $N_3^+$ | 100.0 |
| 45 | $CFN^+$ | 0.13 |
| 47 | $CFO^+$ | 10.7 |
| 52 | $NF_2^+$ | 12.3 |
| 61 | $NFCO^+$ or $N_3F^+$ | 4.64 |
| 70 | $CON_3^+$ | 63.0 |
| 80 | $CONF_2^+$ | 1.0 |

[1] Spectrum corrected for small amounts of $CO_2$, $HN_3$, $HNF_2$, $FCON_3$, and $H_2O$.
[2] Rearrangement ion or trace of fluorocarbon.

The characteristic peaks of the infrared spectrum of $F_2NCON_3$ determined as gas at 10 mm. pressure are:

$N_3$ group—peaks at 4.57 and 8.1 microns
$C=O$ group—peak at 5.55 microns
$NF_2$ group—four peaks between 10 and 11.5 microns The utility of $F_2NCON_3$ as an initiator for the polymerization of tetrafluoroethylene is shown as follows:

A Hastelloy-lined shaker tube is charged with 20 parts of perfluoro-1,3-dimethylcyclobutane, closed, cooled to −70° C. and evacuated. Tetrafluoroethylene (15 parts) and $F_2NCON_3$ (0.04 part) are added to the tube which is then warmed slowly. On reaching 130° C. the pressure rises rapidly from 460 p.s.i.g. to 500 p.s.i.g. Within three minutes the pressure drops to 360 p.s.i.g. and in another 19 minutes falls to 270 p.s.i.g. Over the next 3.5 hours at 130° C. the pressure slowly falls to 215 p.s.i.g. After cooling and venting the tube is opened. A waxy polymer of tetrafluoroethylene (10 parts) melting over 300° C. is removed from the tube.

A control run made in the same manner but with no $F_2NCON_3$ present gave no polymer.

EXAMPLE 4

A stream of fluorine, 0.038 part/minute diluted with nitrogen (0.152 part/min.), is passed through a stirred mixture of 2 parts of

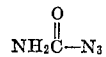

30 parts of NaF and 175 parts of Halocarbon oil (completely halogenated chlorofluoro carbons), for 1.75 hours at 28–37° C. The effluent gases are trapped at −63° C. The trapped liquid is distilled under a good vacuum to give a mixture of $FCON_3$ (30%) and $F_2NCON_3$ (70%). The $FCON_3$ is distilled off at −20° C. under vacuum to give 0.2 part of $F_2NCON_3$. The boiling point is estimated to be about 60° C. but sample decomposition at this temperature prevents accurate determination. The $F^{19}$ NMR spectrum shows a single broad peak at −1928 c.p.s.; 56.4 megacycles versus "Freon-11"® fluorocarbon solvent as an internal reference.

EXAMPLE 5

Fluorine (0.015 part/min.) and nitrogen (0.152 part/min.) are passed through a mixture of 1.3 parts of 2-azidohexafluoro-2-propanol and 45 parts of Halocarbon oil for 100 minutes at ice bath temperature. The off-gases are passed through a −80° C. trap. The trap contains 15% $CF_3CON_3$ after the reaction (about 0.3 part). The mass spectrum is as given below.

TABLE III.—MASS SPECTRUM OF $CF_3CON_3$

| M/e | Ion | Relative abundance (percent) |
|---|---|---|
| 139 | $CF_3CON_3^+$ | 0.9 |
| 120 | $CF_2CON_3^+$ | 1.7 |
| 111 | $CF_3CON^+$ | 2.6 |
| 97 | $CF_3CO^+$ | 4.4 |
| 92 | $CF_2CON^+$ | 4.5 |
| 78 | $CF_2CO^+$ | 1.1 |
| 76 | $CF_2CN^+$ | 0.5 |
| 73 | $CFCON^+$ | 0.2 |
| 70 | $CON_3^+$ | 71.0 |
| 69 | $CF_3^+$ | 100.0 |
| 64 | $CF_2N^+$ | 3.5 |
| 57 | $CFCN^+$ | 0.1 |
| 54 | $CN_3^+$ or $C_2ON$ | 0.2 |
| 50 | $CF_2^+$ | 15.6 |
| 47 | $COF^+$ | 9.6 |
| 45 | $CFN^+$ | 1.8 |
| 42 | $N_3$ or $CON^+$ | 18.2 |
| 40 | $CN_2^+$ | 0.2 |
| 31 | $CF^+$ | 12.9 |
| 30 | $NO$ | 1.6 |
| 28 | $N_2^+$ or $CO^+$ | 15.9 |
| 26 | $CN^+$ | 1.8 |
| 24 | $C_2^+$ | 0.3 |
| 19 | $F^+$ | 0.5 |
| 16 | $O^+$ | 0.7 |
| 14 | $N^+$ | 9.2 |
| 12 | $C^+$ | 5.0 |

The characteristic peaks of the infrared spectrum of $CF_3CON_3$ are:

$N_3$ group—4.5, 4.61 and 8.05 or 8.5 microns
$C=O$ group—5.65 microns
$CF_3$—8.05 or 8.5 microns and 9.63 microns The vapor-pressure-temperature curve of $CF_3CON_3$ is determined by standard means. It is described by the equation $$\log P_m = \frac{-1.72}{T} + 8.22$$

The $\Delta H_v = 7860$ cal./mole and the Trouton constant 24.5 cal./degree. $CF_3CON_3$ is useful as a chemical intermediate and as a cocatalyst for the anionic polymerization of ε-caprolactam as described in U.S. Patent 3,017,391.

45.2 parts of dry ε-caprolactam are melted at 150° C. and sparged with Seaford grade nitrogen (350 cc./min.) for 10 minutes. 0.96 part of NaH (50% active, 50% mineral oil) are added and sparging continued for 5 minutes. Next, a solution of 0.250 part of trifluoroacetyl azide in 1.1 parts of dry benzene under 5 p.s.i. nitrogen pressure in a cylinder is added to the monomer melt. In one hour at 150° C., the reaction mass has turned solid. The polymer is water insoluble.

A similar run but omitting the azide does not solidify after 2 hours.

I claim:
1. Compound having the structure $RCON_3$ wherein R is selected from the group consisting of —F and —$NF_2$.
2. The compound, $FCON_3$.
3. The compound, $F_2NCON_3$.
4. A process for producing $FCON_3$ which comprises contacting molecular fluorine with $CO(N_3)_2$ at a temperature below the decomposition temperature of $CO(N_3)_2$ in an inert solvent.
5. The process of claim 4 which is conducted at a temperature of about from −20 to 30° C.
6. A process for producing $F_2NCON_3$ which comprises contacting molecular fluorine with $H_2NCON_3$ at a tem- perature below the decomposition temperature of H₂NCON₃ in an inert solvent.

7. The process of claim 6 which is conducted at a temperature of about from −20 to 50° C.

8. A process for producing CF₃CON₃ which comprises contacting molecular fluorine with

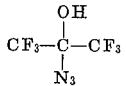

at a temperature below the decomposition temperature of

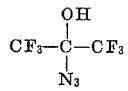

in an inert solvent.

9. The process of claim 8 which is conducted at a temperature of about from −50 to 30° C.

References Cited

UNITED STATES PATENTS 2,617,817  11/1952  Ahlbrecht et al. ---- 260—453

OTHER REFERENCES

Chemical Abstracts 43: 6793 c (1949).

JOHN D. RANDOLPH, *Primary Examiner.*

C. M. SHURKO, *Assistant Examiner.*

U.S. Cl. X.R.

204—158; 252—4, 194; 260—78, 92.1